Nov. 17, 1931.  W. L. SHAFER  1,831,929
HEAT CONTROL SYSTEM
Filed Aug. 13, 1928
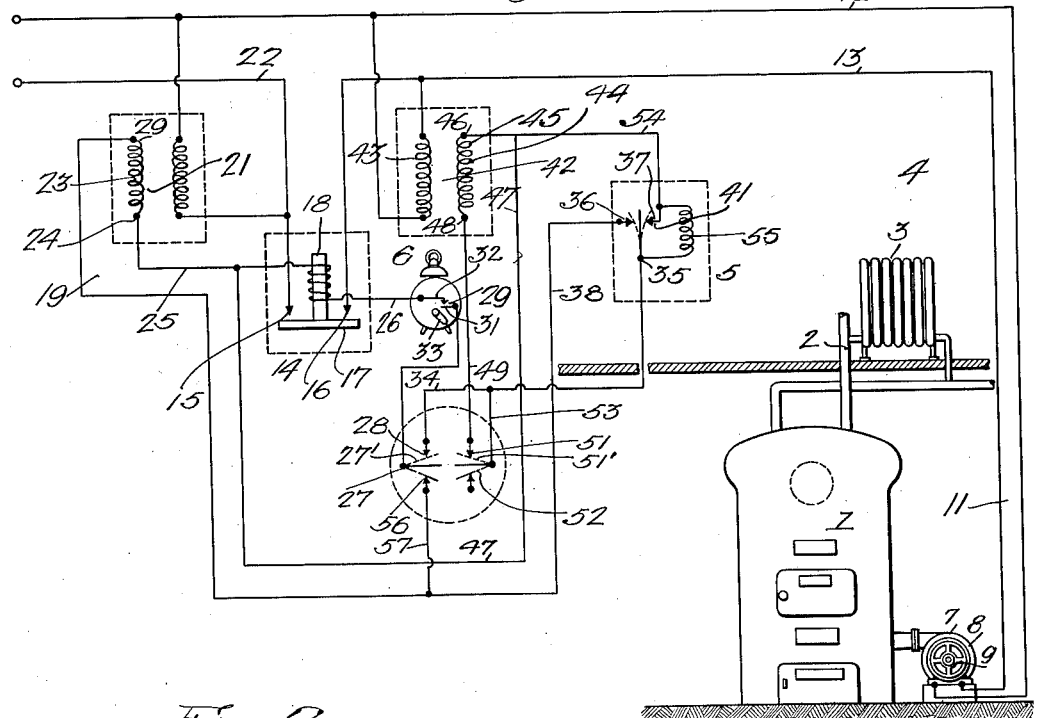
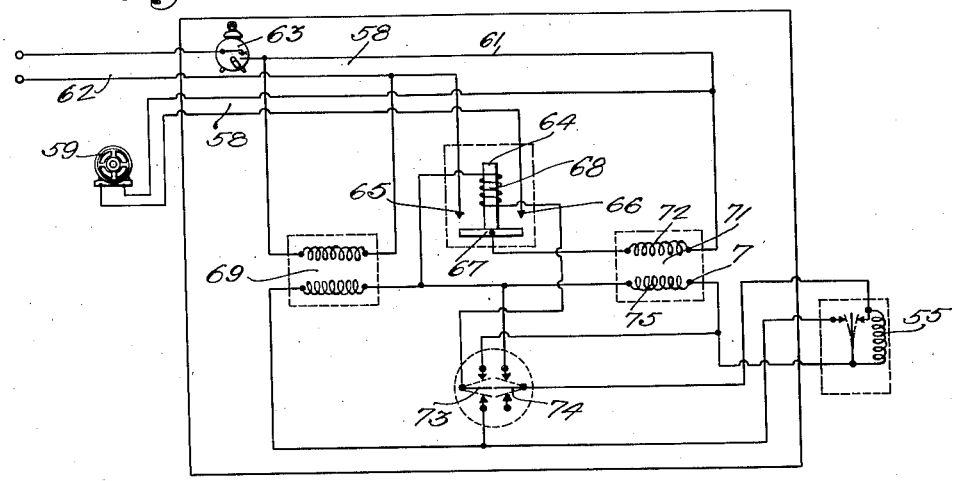
Inventor
William L. Shafer;
by his Attorneys
Howson & Howson Patented Nov. 17, 1931

1,831,929

UNITED STATES PATENT OFFICE

WILLIAM L. SHAFER, OF PITTSBURGH, PENNSYLVANIA, ASSIGNOR, BY MESNE ASSIGNMENTS, TO PENN HEAT CONTROL COMPANY, A CORPORATION OF DELAWARE

HEAT CONTROL SYSTEM

Application filed August 13, 1928. Serial No. 299,332.

My invention relates to systems of control having particular relation to heat regulating systems.

One object of my invention is to provide a system of the character described, constituting an improvement over that disclosed in my Patent No. 1,583,496, filed February 23, 1924, and issued May 4, 1926.

Another object of my invention is to provide a heat control system with a thermostat adapted to maintain close temperature regulation with a minimum number of circuit interruptions.

A further object of my invention is to provide means, whereby the actuating winding of a control switch for a system of the class described may be continuously energized as the thermostat moves from a starting to a stopping contact member.

A still further object of my invention is to provide an electrical system, wherein a secondary heating means for the thermostat may be rendered ineffective upon the engagement of the thermostat with the motor stopping contact.

A still further object of my invention is to provide electrical means for maintaining a control relay in its closed position during the movement of the thermostat from a starting to a stopping contact member and for interrupting a secondary source of heat for the thermostat upon the engagement of the thermostat with the stopping contact member. The use of electrical, rather than mechanical locking means, for the relay during the movement between the contact members very greatly simplifies the practical construction, operation and maintenance of the control system.

A still further object of my invention is to provide a control system for a source of heat, comprising a supply circuit having a control switch provided with an actuating winding, independent energizing means for the winding, a thermostat influenced by the source of heat for successively rendering ineffective the energizing means, and heating means for the thermostat connected to be controlled thereby.

Other objects and applications of my invention, as well as details of construction, operation and circuit arrangement, whereby my invention may be practiced, will be apparent more fully hereinafter, when taken in connection with the following description, claims, and drawings, wherein:

Fig. 1 is a view partially diagrammatic and partially structural of circuits and apparatus embodying my invention; and Fig. 2 is a similar view but showing a modification.

Referring to Fig. 1, a furnace 1 constituting a primary source of heat is connected by piping 2 to a radiator 3 positioned in a room 4 to be heated. A thermostat 5 is positioned in the room 4, and it serves to maintain the room temperature within a predetermined range through the medium of a control system 6 and a heat-regulating means 7 responsive thereto.

The heat-regulating means 7 may comprise a blower 8 for supplying the furnace 1 with a forced draft, though the heat developed by the furnace 1 may be varied in other ways as by controlling the supply of combustible. The blower 8 is operated by a variable-speed electric motor 9 which is connected in a main supply circuit 11 comprising conductors 12 and 13. The energization of the motor 9 is controlled by means of a relay 14, stationary contact members 15 and 16 of which are included in spaced relation in the conductor 13. A movable contact member 17 is normally held by gravity out of engagement with the contact members 15 and 16, but it may be moved upwardly into engagement therewith upon the energization of a relay actuating winding 18.

The actuating winding 18 of the relay 14 is connected in a secondary circuit 19 of a transformer 21, a primary circuit 22 of which extends from the relay contact member 15 in the conductor 13 to the conductor 12, so that it is energized at all times regardless of the operation or inoperation of the relay 14. The secondary circuit 19 comprises a secondary winding 23 having a terminal 24 from which extends a conductor 25, the latter terminating at one end of the actuating winding 18 of the relay 14. Another end of the actuating winding 18 is connected by means of a conductor 26 to a movable contact member 27 having a co-acting stationary contact member 28 forming a switch 27'. The conductor 26 may include a clock-operated switch 29 comprising a movable contact member 31 and a stationary contact member 32, the movable contact member being in operative relation to an actuating element 33 operated by the clock at a predetermined time and adapted to maintain the switch closed for a desired interval, usually several hours.

The stationary contact member 28 is connected by a conductor 34 to a terminal 35 on the thermostat 5. The thermostat 5, which is of usual design, moves between spaced stationary contact members 36 and 37, serving to connect the terminal 35 with one or the other of these contact members depending upon whether the temperature of the room 4 is low or high. The contact member 36 is connected by a conductor 38 to a remaining terminal 39 of the transformer secondary winding 23. Thus, when the thermostat 5 is in engagement with the stationary contact member 36, the secondary circuit 19 is completed through the actuating winding 18 of the relay 14, causing the latter to close the main supply circuit 11 and start the motor 9. The operation of the motor 9 causes an increased supply of air to the furnace 1 from the blower 8, with the result that the temperature of the furnace 1 and hence that of the radiator 3 increases. When the increase in temperature in the room 4 has reached a predetermined value, as will presently appear in greater detail, the thermostat 5 moves out of engagement with the contact member 36, opening the secondary circuit 19, whereupon the relay 14 causes the stopping of the motor 9.

Experience has shown that use of a single contact thermostat causes an undesirable number of motor operations, resulting in the rapid deterioration of the motor as well as the thermostat contacts. Frequent starting and stopping of the motor also not only results in a loss of power, but causes serious disturbance in adjacent radio apparatus. These, as well as other undesirable results, are overcome in my invention by the provision of a second contact 41 in operative relation to the thermostat 5, and by the further provision of an auxiliary or secondary energizing means for the relay winding 18 which is independent of the primary energizing transformer 21 and which is effective while the thermostat 5 is moving, due to a temperature increase in the room 4, from engagement with the contact member 36 into engagement with the contact member 37.

The auxiliary energizing means may comprise a transformer 42, a primary winding 43 of which is connected in shunt relation to the motor 9 across the supply circuit 11, so as to be energized only upon the closing of the relay 14. A secondary circuit 44 for the transformer 42 includes a secondary winding 45, one terminal 46 of which is connected by a conductor 47 to the conductor 25 extending from the corresponding terminal of the transformer 21. The other terminal 48 of the secondary winding 45 is connected by a conductor 49 to a stationary contact member 51 which cooperates with a movable contact member 52 forming a switch 51'. The movable member 52 is connected by a conductor 53 to the conductor 34 which leads to the thermostat 5 and the other terminal of the transformer 21. The secondary circuit 44 of the transformer 42 is completed through the stationary and movable contact members 28 and 27, respectively, the clock-operated switch 29, and the actuating winding 18 of the relay 14. Hence, the relay 14 is energized by the secondary circuit 44 independently of the secondary circuit 19. It is noted that this energization occurs not only while the thermostat 5 is in engagement with the starting contact 36, but also during the period the thermostat 5 is moving between the starting contact member 36 and the stopping contact member 37.

The actuating winding 18 of the relay 14 may be de-energized and the motor 9 stopped, when the thermostat 5 engages the stopping contact member 37, by use of a shorting conductor 54 which extends from the contact member 37 to the conductor 47 of the secondary circuit 44. When the thermostat 5 engages the stopping contact 37, a short circuit is provided around the relay 14, which extends from one end of the transformer secondary winding 45, through the conductor 47, the conductor 54, the stopping contact member 37, the thermostat 5, the conductor 34, the conductor 53, the movable and stationary contact members 52 and 51, respectively, and the conductor 49, to the other end of the transformer secondary winding 45. Such short circuiting, therefore, causes the opening of the relay 14 and the stopping of the motor 9.

The even control of the temperature of the room 4 is further assured by the provision of secondary or auxiliary heating means for the thermostat 5 comprising a heating element 55 which causes the temperature immediately adjacent to the thermostat to be, say, 2 degrees above room temperature. In accordance with my invention, the heating element 55 is so connected in the control system as to be energized during the period that the thermostat is in engagement with the starting contact member 36, as well as during the time that the thermostat is moving between the starting and stopping contact members 36 and 37, respectively. This result is accomplished by connecting one end of the heating element 55 to the stopping contact member 37 and the other end to the terminal connection 35 of the thermostat 5.

Assuming, for example, a desired room temperature of 70 degrees F. and the adjustment of the thermostat 5 by means (not shown), so that contact is broken with member 36 at 66 degrees and made with member 37 at 68 degrees, and further assuming that the temperature of the room 4 is below the desired value, the thermostat 5 moves into engagement with the starting contact member 36 to complete the secondary circuit 19 of the transformer 21. Current then passes from the transformer 21 through the relay 14, the closed clock-operated switch 29, the movable and stationary contact members 27 and 28, respectively, and the thermostat 5, causing the closing of the relay 14 and the energization of the motor 9 and also the transformer 42. The energization of the transformer 42 causes currents to pass therefrom through the relay 14 in the same direction as the currents from the transformer 21, the movable and stationary contact members 27 and 28, respectively, and the movable and stationary contact members 52 and 51, respectively.

When the thermostat 5 engages the starting contact member 36, the heating element 55 is also energized, inasmuch as it is connected in shunt relation to the transformer secondary winding 23 by means of the conductor 25, the conductor 47, the conductor 54, the heating element 55, the thermostat 5 and the conductor 38. Upon the closing of the relay 14, the heating element 55 is also energized by the transformer 42, being included in a heating circuit comprising the transformer secondary winding 45, the conductor 47, the conductor 54, the heating element 55, the conductor 34, the conductor 53, the movable and stationary contact members 52 and 51, respectively, and the conductor 49.

The operation of the motor 9, following the closing of the relay 14, causes an increase in the rate of combustion in the furnace 1 and a corresponding increase in the temperature of the radiator 3 in the room 4. When the room temperature reaches 66 degrees, the temperature of the thermostat is, in fact, 68 degrees, due to the 2 degrees of preheat established by the heating element 55. The thermostat 5 now moves out of engagement with the starting contact member 36, disconnecting the transformer 21 from the relay 18, as well as the heating element 55. The relay 14, however, remains closed, since the transformer 42 is energized and connected thereto. The 2 degrees of preheat is also maintained inasmuch as the heating element 55 is now energized by the transformer 42.

When the room temperature reaches 68 degrees, the temperature of the thermostat is 70 degrees, with the result that the thermostat 5 moves into engagement with the stopping contact member 37. Not only is the heating element 55 now short circuited, but also the energizing circuit 18 of the relay 14, so that the supply circuit 11 is opened and the motor 9 de-energized. The rate of combustion in the furnace now slowly decreases with the stopping of the blower 8, but for some time, heat is delivered by the radiator 3, causing a continued rise in the room temperature from 68 degrees to 70 degrees and possibly slightly above.

The rate of combustion, however, in the furnace 1 finally decreases to such value that the temperature of the air in room 4 no longer rises but starts to fall, and as it passes below the desired 70 degrees, the thermostat 5 moves out of engagement with the stopping contact member 37 into engagement with the starting contact member 36, whereupon, the foregoing cycle is again repeated, the system finally reaching the condition wherein long rather than short periods of running and stopping are obtained. For example, in one installation, the motor operated for a period of eight minutes, followed by a stopping period of eight to twelve minutes. The operation of the system, as a whole, is finally interrupted automatically when the switch 29 is opened by the actuating element 33 of the clock.

It is noted that applicant has employed electrical rather than mechanical locking means for the relay 14 and the heating element 55 in connection with the two-point contact thermostat 5. In this way, such difficulties incident to mechanical locking means as the adjustment of a plurality of sets of contacts is eliminated. Moreover, the construction, as well as the operation, of the control system is very greatly simplified.

When it is desired to cause the operation of the relay 14 over a long period of time independently of the thermostat 5, the movable contact members 27 and 52 are actuated out of engagement with their co-operating stationary contact members 21 and 51, respectively, the actuation of the movable switch element 27 being continued until it engages a stationary contact member 56 which is connected by a conductor 57 to the conductor 38 extending to one end of the secondary winding 23 of the transformer 21. The movement of the contact members 27 and 52 may be simultaneously effected by assembling the same in the rotor of a snap switch, though this has not been shown to simplify the description of the invention.

The actuation of the movable contact member 52 out of engagement with the co-operating stationary contact member 51 serves to open the secondary circuit 44 of the transformer 42, while the movement of the contact member 27 out of engagement with the contact member 28 causes the opening of the transformer secondary circuit 19. At this time, the heating element 55 and the relay 14 are further disconnected from the transformers 21 and 42. The further operation of the movable switch member 27 into engagement with the stationary contact member 56 completes an energizing circuit for the relay 14 which extends from the secondary winding 23 through the conductor 25, the actuating winding 18, the conductor 26, the clock-operated switch 29, the movable contact member 27, the stationary contact member 56, the conductor 57 and the conductor 38, to the secondary winding 23.

In Fig. 2 is illustrated an alternative embodiment of my invention, wherein a primary circuit 58 for a motor 59 comprises conductors 61 and 62. A clock-operated switch 63 may be inserted in the conductor 61, while a relay 64 comprising spaced contact members 65 and 66 and a movable contact member 67 are inserted in the other conductor 62. The relay 64 further comprises an actuating winding 68 which is connected in shunt relation to a pair of parallel-connected transformers 69 and 71 corresponding to the transformers 21 and 42 of Fig. 1. The primary winding 72 of the transformer 71 has one terminal connected to the conductor 61, while the other terminal is connected to the movable contact member 67 of the relay 64.

The system is otherwise as shown in Fig. 1, with the exception of switches 73 and 74 corresponding to switches 27' and 51' of Fig. 1. In Fig. 2, the switch 74 controls the heating circuit for the heating element 55, being connected in series-circuit relation therewith, as well as a secondary winding 75 of the transformer 71, whereas in Fig. 1, the switch 51' controls the connection of one end of the transformer secondary winding 45 to the heating element 55 and to the relay 14. The switch 73 in Fig. 2 serves to control the passage of currents from the parallel-connected transformers 69 and 71 through the actuating winding 68 of the relay 64, whereas in Fig. 1, the switch 27' interrupts the connection between the relay 14, the thermostat 5 and the heating element 55. In other words, in Fig. 1, each of the secondary circuits is provided with an independent control switch, whereas in Fig. 2, a single switch 73 only is employed, and, in addition, a switch 74 is directly inserted in the short-circuiting connection for the heating element 55.

While I have shown several embodiments of my invention, for the purpose of describing the same and illustrating its principles of construction and operation, it is apparent that various changes and modifications may be made therein, without departing from the spirit of my invention. I desire, therefore, that only such limitations be imposed thereon, as are indicated in the appended claims or as are demanded by the prior art.

I claim:

1. In an electrical system, the combination with a load and a supply circuit therefor, of a control switch for said supply circuit provided with an actuating winding, a plurality of independent energizing means for said winding in inductive relation with said supply circuit on opposite sides of said switch, and thermostatic means responsive to predetermined temperature conditions controlled by said load and so connected to said energizing means as to successively open-circuit one of said energizing means and short-circuit the other of said energizing means, whereby the operation of said switch may be controlled.

2. In an electrical system, the combination with a supply circuit and a load, of a switch for controlling said supply circuit provided with an actuating winding, a pair of transformers connected to said supply circuit for energizing said actuating winding and having their secondary windings connected in shunt relation, and a thermostat responsive to predetermined temperature conditions controlled by said load and so connected to said secondary windings as to successively interrupt the connection between said windings and short-circuit one of said windings.

3. The combination with a supply circuit and load, of a switch for controlling said load provided with an actuating winding, a plurality of energy sources for said winding whereby said switch is caused to close said supply circuit, a thermostat responsive to predetermined temperature conditions controlled by said load for successively rendering ineffective said energy sources, and an electric heater energized from one of said sources for influencing said thermostat and rendered ineffective upon the interruption of said last-mentioned energy source.

4. In a heating system, a primary source of heat comprising means for producing combustion, means for transferring the heat to a desired region, means controlling the combustion, an electric circuit controlling said combustion-controlling means, a switch for closing said circuit provided with an actuating winding, means associated with said circuit for energizing said winding, a thermostat in said desired region responsive to said transferred heat for rendering said energizing means effective at a predetermined temperature whereby said switch is caused to close said circuit and for rendering said energizing means ineffective at another predetermined temperature, and auxiliary means associated with said electric circuit and effective upon the closure of said switch for energizing said actuating winding when said first-mentioned energizing means is rendered ineffective by said thermostat.

5. In a heating system, a primary source of heat comprising means for producing combustion, means for transferring the heat to a desired region, means controlling the combustion, an electric circuit controlling said combustion-controlling means, a switch for closing said circuit provided with an actuating winding, means associated with said circuit for energizing said winding, a thermostat in said desired region responsive to said transferred heat for rendering said energizing means effective at a predetermined temperature whereby said switch is caused to close said circuit and for rendering said energizing means ineffective at another predetermined temperature, auxiliary means associated with said electric circuit and effective upon the closure of said switch for energizing said actuating winding when said first-mentioned energizing means is rendered ineffective by said thermostat, and a secondary source of heat deriving its energy from said auxiliary energizing means for influencing said thermostat and controlled thereby.

6. In a heating system, a primary source of heat, means for transferring said heat to a desired region, a control circuit for said source of heat provided with a switch having an actuating winding, a plurality of independent energizing means associated with said control circuit and in shunt relation with each other connected to said winding for energizing it, a thermostat in said region operative at a predetermined temperature to successively render ineffective said independent energizing means, and a heating element in circuit with one of said energizing means for influencing the thermostat and connected to be rendered ineffective upon said operation of said thermostat.

7. In a heat control system, the combination with a primary source of heat and means for transferring said heat to a desired region, of a supply circuit for controlling said primary source having a switch provided with an actuating winding, a plurality of energizing means associated with said supply circuit for energizing said winding, a thermostat responsive to a predetermined temperature in said region comprising a movable element, a pair of fixed contacts for engagement therewith so connected in said system as to render one of said energizing means effective when said movable element is in engagement with one contact and to render another of said energizing means ineffective when said movable element is in engagement with the other contact, and a heating element in circuit with said last-mentioned energizing means for influencing said thermostat and rendered effective with said first energizing means and ineffective with said second energizing means.

8. In an electrical system, the combination with a load circuit and a supply circuit therefor, of a control switch for said supply circuit provided with an actuating winding, a plurality of independent transformers for energizing said actuating winding, one of said transformers normally connected to said supply circuit, and another of said transformers normally connected to said load circuit and to said actuating winding, and a thermostatic means movable between two positions, said thermostatic means when in one position energizing said one transformer to effect closing of said control switch and when in the other position short circuiting said other transformer to effect opening of said control switch.

9. In an electrical system, the combination with a supply circuit and a load, of a control switch for said supply circuit provided with an actuating winding, a pair of transformers for energizing said actuating winding, one of said transformers having its primary normally connected to said supply circuit and the other of said transformers having its primary normally connected to said load and its secondary to said actuating winding, and a thermostatic device for connecting said actuating winding to the secondary of said one transformer to close said switch under certain predetermined temperature conditions and to break said connection and short circuit the secondary of said other transformer to open said switch under other predetermined temperature conditions.

10. In an electrical system, the combination with a circuit and a control relay therefor provided with an actuating winding, of a transformer having its primary normally energized for initially energizing said actuating winding from the secondary thereof, a thermal responsive device operative at a predetermined temperature to render said transformer effective to operate said relay to close said circuit, a second transformer having its primary connected in said circuit and its secondary connected to said actuating winding, said second transformer being rendered effective upon operation of said relay and remaining energized until said thermal responsive device short circuits said second transformer to deenergize said control relay.

11. In an electrical system, the combination with a circuit and a control relay therefor provided with an actuating winding, a transformer having its primary normally energized and its secondary connected for energizing said actuating winding to close said circuit, thermal control means operative at a predetermined temperature to render said transformer effective to energize said actuating winding, and a second transformer having its primary connected in said circuit and energized upon closing of said circuit, the secondary of said second transformer being connected to said actuating winding to maintain energization of said winding when said thermal control device deenergizes said first transformer, said thermal control means short circuiting the secondary of said second transformer to deenergize said relay under other predetermined temperatures.

12. In an electrical system, the combination with a supply circuit and a load, of a control switch for said supply circuit provided with an actuating winding, a pair of transformers for energizing said actuating winding, one of said transformers having a primary normally connected to the supply circuit and the other transformer having its primary normally connected to the load, the secondary of said other transformer normally connected to said actuating winding, a two position thermal element responsive to the temperature conditions controlled by said load, said element when in one position connecting the secondary of said first transformer to said actuating winding to effect closing of the switch and when in the other position disconnecting said first transformer and short circuiting the secondary of said second transformer to effect opening of said switch.

WILLIAM L. SHAFER.